United States Patent
Nishioka

(10) Patent No.: US 6,267,619 B1
(45) Date of Patent: *Jul. 31, 2001

(54) CARD CONNECTOR HAVING MEANS FOR DETECTING INSERTION OF A CARD

(75) Inventor: Toru Nishioka, Miyagi-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/364,586

(22) Filed: Jul. 30, 1999

(30) Foreign Application Priority Data

Jul. 30, 1998 (JP) .................................................. 10-215980

(51) Int. Cl.[7] ...................................................... H01R 3/00
(52) U.S. Cl. ........................................... 439/489; 439/630
(58) Field of Search ..................................... 439/630, 567, 439/188, 489; 235/441

(56) References Cited

U.S. PATENT DOCUMENTS

| | | | |
|---|---|---|---|
| 4,900,273 | 2/1990 | Pernet | 439/630 |
| 5,013,255 | * 5/1991 | Juret et al. | 439/260 |
| 5,964,608 | * 10/1999 | Lotz | 439/188 |
| 5,997,345 | * 12/1999 | Inadama | 439/489 |
| 6,004,155 | * 12/1999 | Wu | 439/489 |
| 6,086,426 | * 12/1999 | Chang | 439/630 |
| 6,089,919 | * 7/2000 | Nishioka | 439/630 |
| 6,120,310 | * 9/2000 | Chang | 439/188 |
| 6,126,464 | * 10/2000 | Chang | 439/188 |

* cited by examiner

*Primary Examiner*—Brian Sircus
*Assistant Examiner*—Son V. Nguyen
(74) *Attorney, Agent, or Firm*—Brinks Hofer Gilson & Lione

(57) ABSTRACT

An IC card connector achieves a stable loaded state of an IC card, and excellent operation reliability. The IC card connector includes a card detecting device that has a fixed terminal and a movable terminal and that detects the insertion of a card by moving the movable terminal in response to the insertion of the card so as to switch a switch between the fixed terminal and the movable terminal. Resilient force of the movable terminal produced by the insertion of the card does not act in the ejecting direction of the card.

6 Claims, 25 Drawing Sheets

CARD CONNECTOR HAVING MEANS FOR DETECTING INSERTION OF A CARD

BACKGROUND OF THE INVENTION

1. Field of the Invention

The present invention relates to a card connector for use in exchanging signals with an inserted card, e.g., an IC card, and more particularly, to a card connector having a detection switch for sensing that a card has been inserted in a card slot.

2. Description of the Related Art

An IC card contains an IC chip having calculation and storage functions. Information processing equipment for processing information by using this IC card as a medium, i.e., a personal computer and a digital camera, is equipped with an IC card connector having a plurality of terminals corresponding to contact patterns formed on the surface of the IC card.

An IC card connector has been known hitherto, in which a connector body is provided with a normally closed detection switch for sensing that an IC card has been inserted in a card slot (see, for example, U.S. Pat. No. 4,900,273). FIGS. 34 to 37 show the mechanism of the IC card connector. FIGS. 34 and 35 are partial side and partial plan views, respectively, showing a state before an IC card is inserted in the card slot, and FIGS. 36 and 37 are partial side and partial plan views, respectively, showing a state in which the IC card is inserted in the card slot.

As shown in these figures, a card slot 102, in which an IC card 101 (see FIG. 36) is inserted, is formed at a predetermined position of a connector body 100. Below the card slot 102, a movable terminal 103 and a fixed terminal 104 extending along the inserting direction (X-direction) of the IC card 101 are mounted to constitute a normally closed detection switch.

Before the IC card 101 is inserted in the card slot 102, the movable terminal 103 is inclined and is in elastic contact with the fixed terminal 104, and a bent leading end portion 103a thereof is placed inside the card slot 102, as shown in FIG. 34. Numeral 105 denotes a space portion for allowing pressure deformation of the movable terminal 103.

When the IC card 101 is inserted in the card slot 102, as shown in FIG. 36, the leading end portion 103a of the movable terminal 103 is pressed by the leading end portion of the IC card 101. The movable terminal 103 is thereby pressed down, and a leading end portion 103a of the fixed terminal 104 performs self-cleaning in sliding contact with the upper surface of the movable terminal 103, while the movable terminal 103 separates from the fixed terminal 104, so that the insertion of the IC card 101 is electrically detected. Furthermore, the IC card 101 is elastically held by repulsive force produced by pressure deformation of the movable terminal 103, and is kept in the inserted state. In this state, signal exchange (information processing) is carried out.

When the IC card 101 is drawn out of the card slot 102 after the completion of information processing, the movable terminal 103 returns to the state shown in FIG. 34 by its repulsive force, and makes contact again with the fixed terminal 104, whereby the ejection of the IC card 101 is detected.

In this normally closed detection switch, however, since elastic force always acts in the card ejecting direction (the direction of the arrow Y in FIG. 36) when the IC card 101 is inserted, the card 101 is liable to come out due to vibrations or the like, and it is difficult to hold it stably. For this reason, there is a problem with operation reliability in information processing.

When elastic force is reduced due to changes in the movable terminal 103 over time, the force for holding the inserted IC card 101 is also reduced, and the card is liable to come out due to even small vibrations.

Furthermore, since the detection switch is placed under the card slot 102 and is directly exposed on the side of the card slot 102, contaminants, oil, and the like which have entered with the inserted IC card 101 are scraped and collected at the contact portion of the detection switch, which may cause contact failure.

SUMMARY OF THE INVENTION

An object of the present invention is to solve such problems of the conventional art, and to provide a card connector having a simple structure and excellent operation reliability in which the loaded state of a card is stable.

In order to achieve the above object, according to an aspect of the present invention, there is provided a card connector including a card detecting means, having a fixed terminal and a movable terminal, for detecting the insertion of a card, e.g., an IC card, by moving the movable terminal in response to the insertion of the card so as to switch a switch between the fixed terminal and the movable terminal, wherein resilient force of the movable terminal produced by the insertion of the card does not act in the ejecting direction of the card.

Since the acting direction of resilient force of the movable terminal differs from the ejecting direction of the card in this way, even when vibration is given while the card is inserted, the loaded state of the card is stabilized, and therefore, operation reliability can be improved.

Preferably, the acting direction of the resilient force of the movable terminal produced by the insertion of the card is orthogonal to the ejecting direction of the card. This further stabilizes the loaded state of the card, and improves operation reliability.

Preferably, the movable terminal has an inclined portion formed of, e.g., an actuator portion, which will be described later, and a part of the card runs onto the inclined portion so that the resilient force of the movable terminal does not act in the ejecting direction of the card. Such a simple structure in which only an inclined portion is formed in the movable terminal can stabilize the loaded state of the card.

Preferably, the movable terminal has an inclined portion, the fixed terminal and the movable terminal are in contact with each other when the card is not inserted, the movable terminal moves in contact with the fixed terminal when a part of the card impinges on the inclined portion, and the movable terminal separates from the fixed terminal when the card is inserted further and the part of the card runs onto the inclined portion. In this case, while the movable terminal moves in contact with the fixed terminal, the effect of cleaning the contact portion therebetween is obtained. In addition, it is possible to simplify the structure, to further stabilize the loaded state of the card, and to improve operation reliability.

A stopper means formed of, e.g., a projection, which will be described later, may be provided to limit the distance over which the movable terminal moves in contact with the fixed terminal. This stopper means allows the moving distance of the movable terminal to be reduced, and therefore, the movement of the movable terminal does not have an adverse effect on switching accuracy.

Preferably, the movable terminal and the inclined portion are formed in one piece. This simplifies the structure, and reduces the costs.

Preferably, a mounting portion for the fixed terminal and the movable terminal is provided adjacent to a card slot, a partition is formed between the mounting portion and the card slot, and the inclined portion of the movable terminal protrudes toward the card slot through a cutout portion formed in the partition. By forming the partition and moving the movable terminal via the inclined portion in this way, it is possible to prevent the detection switch from being contaminated by dust or the like, and to precisely detect the insertion and ejection of a card over a long service life.

Further objects, features, and advantages of the present invention will become apparent from the following description of the preferred embodiments with reference to the attached drawings.

DESCRIPTION OF THE PREFERRED EMBODIMENTS

Figure 5:
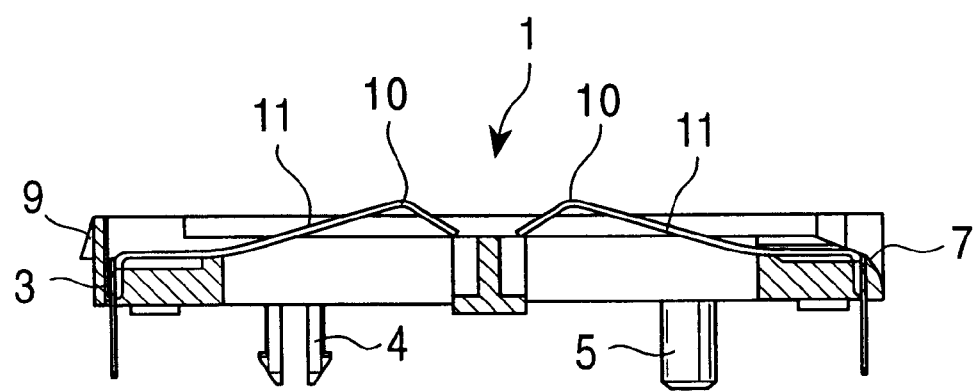
FIG. 5 is a cross-sectional view of the housing with contact terminals mounted therein.

Next, an IC card connector according to a first embodiment of the present invention will be described with reference to the attached drawings. FIGS. 1 to 4 are plan, left side, right side, and front views, respectively, of a housing before contact terminals are mounted therein in the IC card connector, and FIG. 5 is a cross-sectional view of the housing after the contact terminals are mounted. FIGS. 6 to 9 are plan, left side, right side, and front views of a cover in the IC card connector, respectively.

Figure 1:
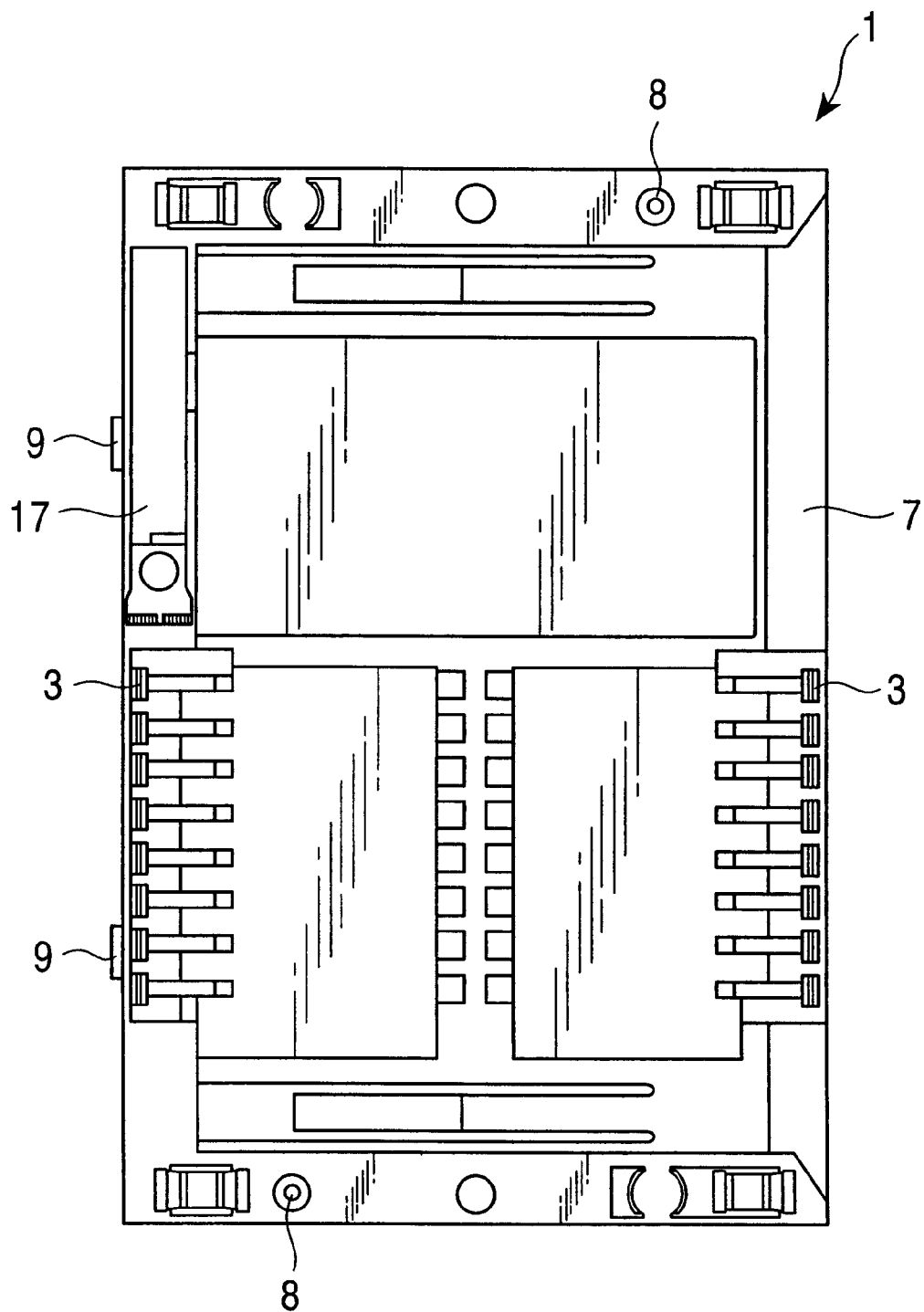
FIG. 1 is a plan view of a housing used in an IC card connector according to a first embodiment of the present invention.
Figure 2:
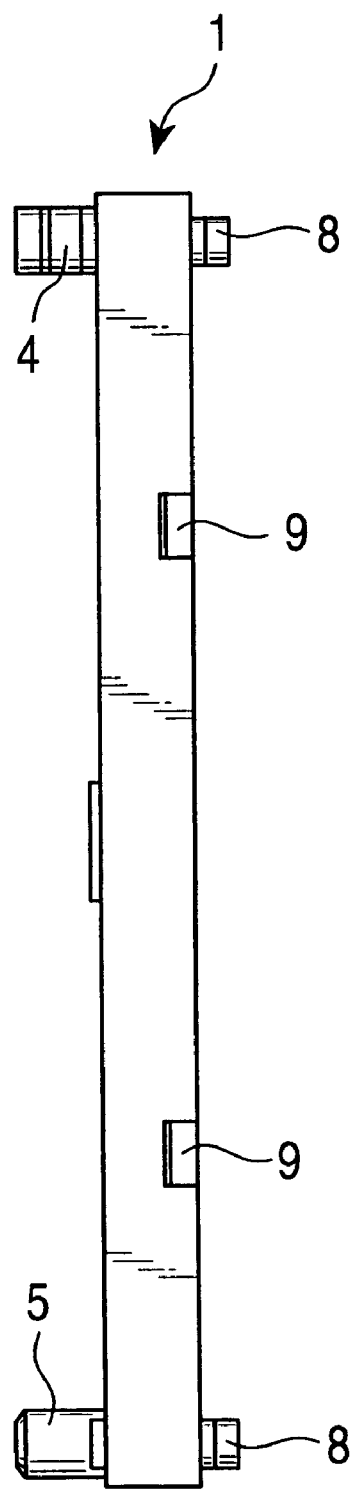
FIG. 2 is a left side view of the housing.
Figure 3:
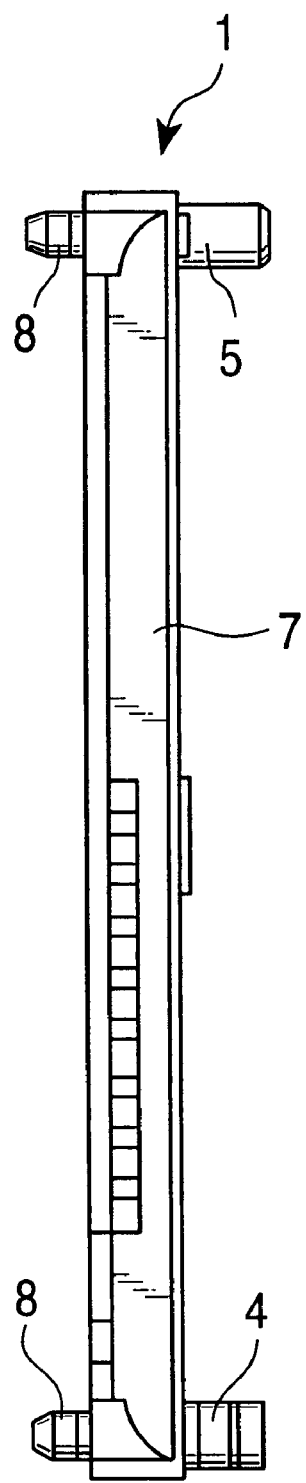
FIG. 3 is a right side view of the housing.
Figure 4:
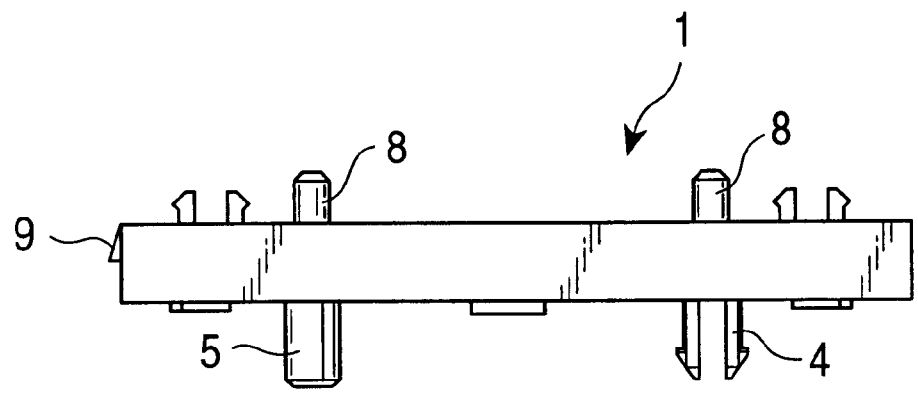
FIG. 4 is a front view of the housing.

The IC card connector of this embodiment mainly comprises a housing 1 and a cover 2, both of which are formed of a mold of synthetic resin. The housing 1 has a plurality of terminal insertion holes 3 arranged in a row on both sides thereof, as shown in FIG. 1, and also has, on its lower surface, a predetermined number of mounting feet 4 and bosses 5 for attaching the connector to information processing equipment (e.g., a personal computer or a digital camera). The housing 1 also has an inclined face 7 for guiding an IC card 6 during insertion, at the right side end thereof, two pins 8 projecting from the top face thereof, and retaining claws 9 on the left side thereof.

As shown in FIG. 5, a plurality of contact terminals 11, each having an angular contact portion 10 at its free end, are press-fitted in the terminal insertion holes 3, and are fixed in a cantilevered manner. The angular contact portions 10 slightly project from the upper surface of the housing 1. A detection switch mounting portion 17 having a concave shape is formed near the left side face of the housing 1. as shown in FIG. 1.

Figure 6:
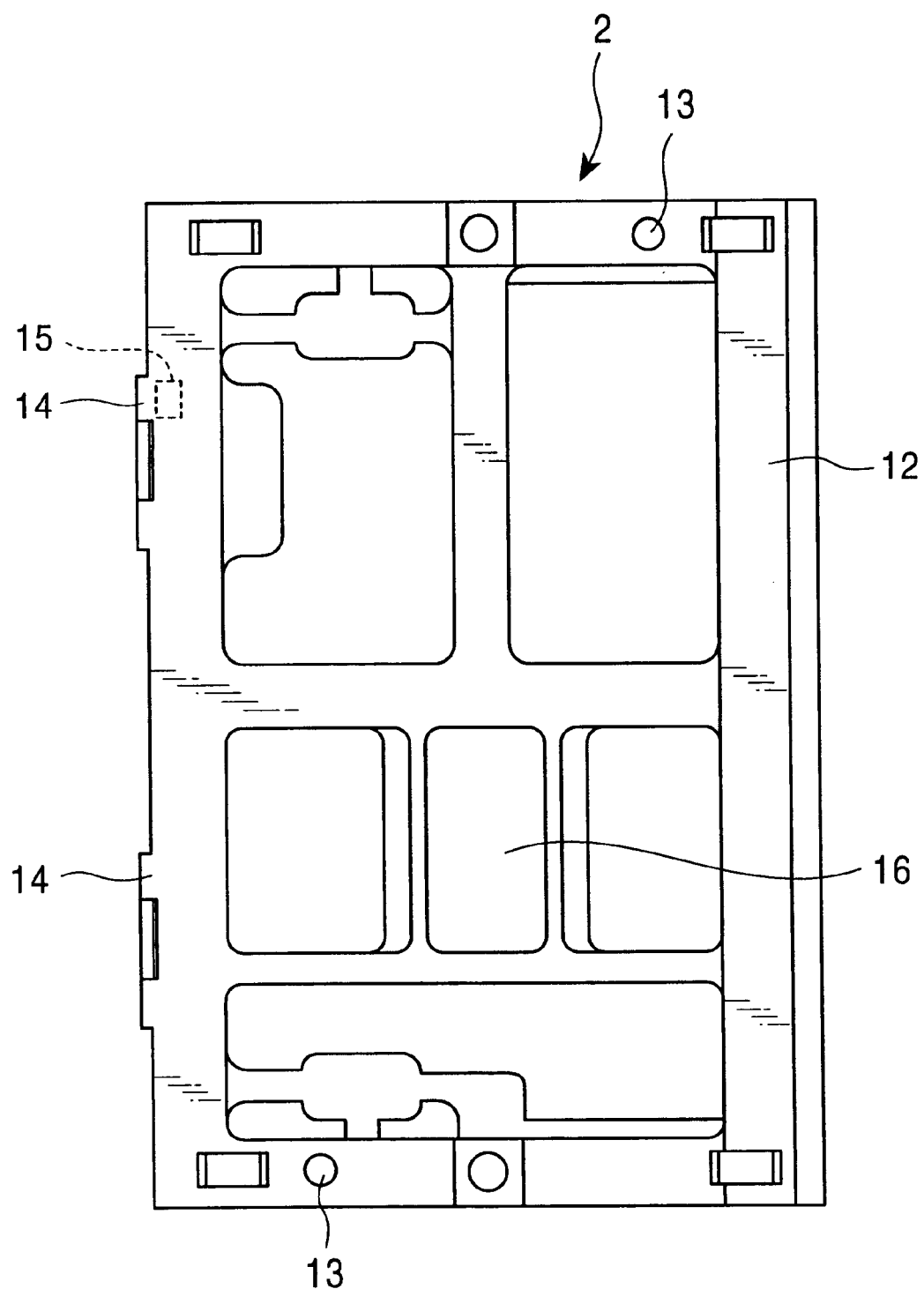
FIG. 6 is a plan view of a cover used in the IC card connector.
Figure 7:
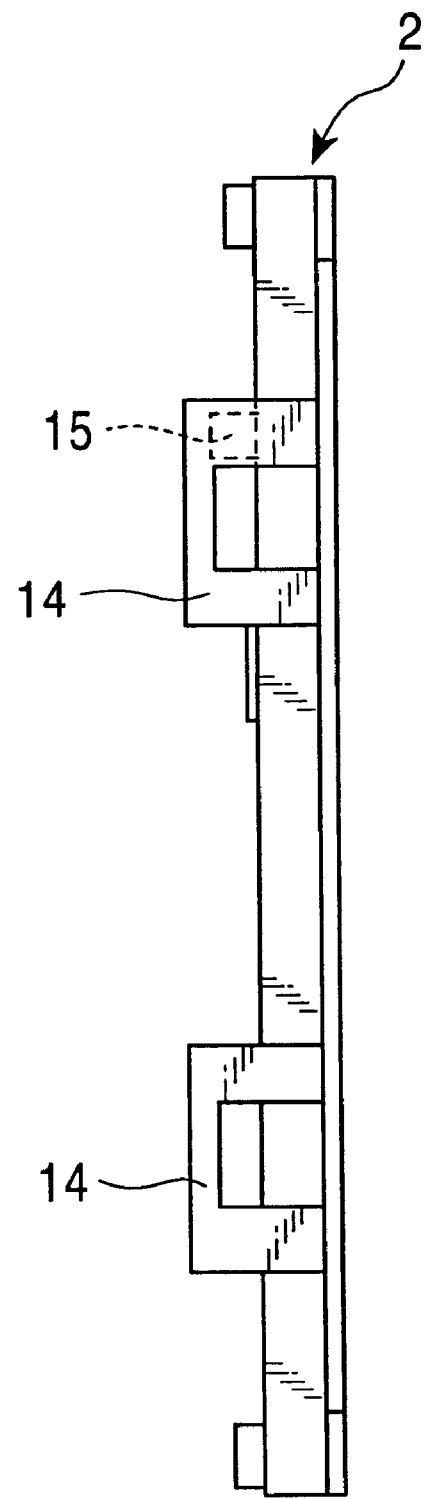
FIG. 7 is a left side view of the cover.
Figure 8:
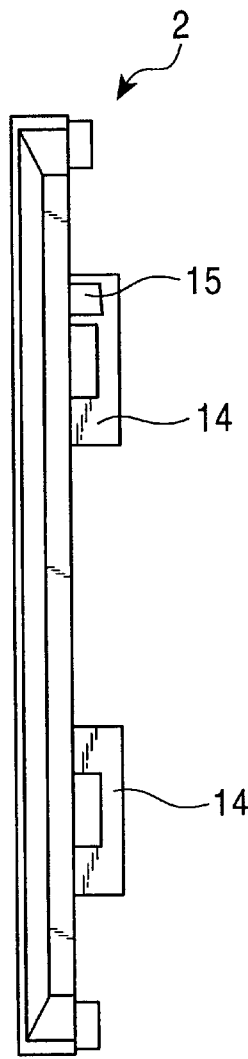
FIG. 8 is a right side view of the cover.
Figure 9:
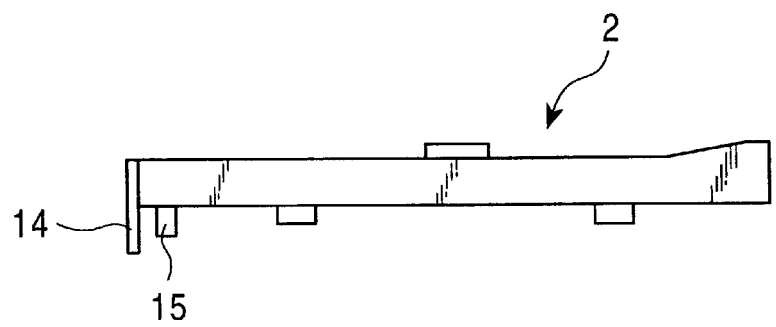
FIG. 9 is a front view of the cover.

The cover 2 is provided with an inclined face 12 formed at its right side end so as to guide the IC card 6 that is being inserted, two holes 13 on its upper surface, and retaining frames 14 projecting from its left side. A projection 15 is formed adjacent to one of the retaining frames 14. As shown in FIG. 6, a receiving portion 16 having a flat lower surface is provided at the position opposed to the contact portions 10 of the contact terminals 11.

Figure 10:
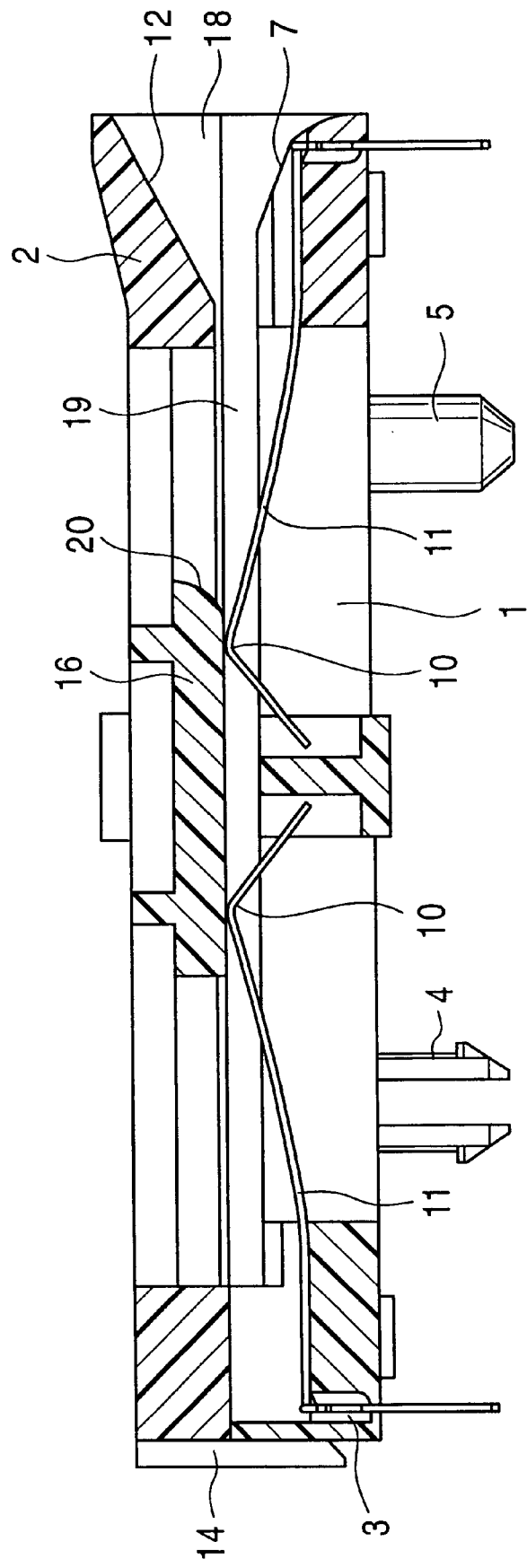
FIG. 10 is a cross-sectional view showing the state of the contact terminals before an IC card is inserted.
Figure 11:
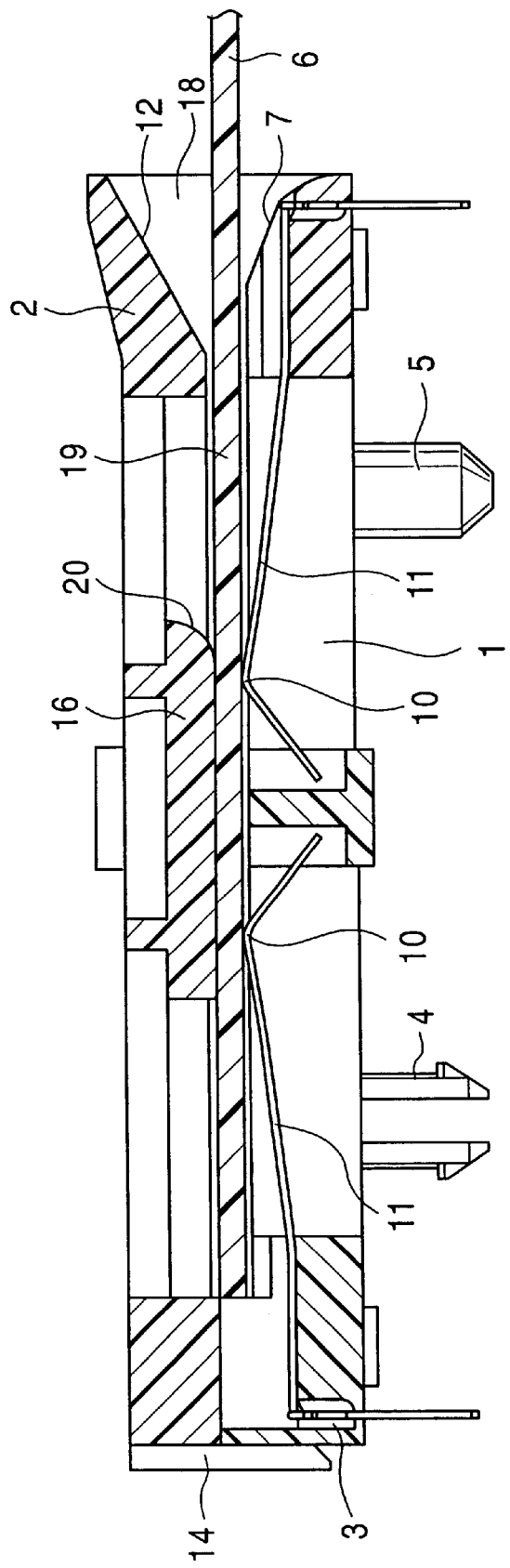
FIG. 11 is a cross-sectional view showing the state of the contact terminals after the IC card is inserted.

FIGS. 10 and 11 are cross-sectional views of the IC card connector. FIG. 10 shows a state before the IC card 6 is inserted, and FIG. 11 shows a state when the insertion of the IC card 6 has been completed. The cover 2 is placed on the housing 1, the pins 8 of the housing 1 are inserted in the holes 13 of the cover 2, and the retaining frames 14 of the cover 2 are engaged with the retaining claws 9 of the housing 1, whereby the housing 1 and the cover 2 are combined into one, as shown in FIG. 10.

By this combination, a card slot 19 having a card insertion opening 18 is formed between the housing 1 and the cover 2, the inclined faces 7 and 12 are placed to face each other at the card insertion opening 18, and the contact portions 10 of the contact terminals 11 are brought into elastic contact with the lower surface of the receiving portion 16.

When the IC card 6 is inserted through the card insertion opening 18 with contact patterns (not shown) facing down, the contact terminals 11 are pressed down by the leading end portion of the IC card 6, and make contact with the contact patterns of the IC card 6 at an inserted position of the IC card 6 (see FIG. 11), whereby signal exchange is made possible, and the IC card 6 is elastically clamped between the contact terminals 11 and the receiving portion 16. As shown in FIGS. 10 and 11, a round or inclined guide portion 20 is formed at the end of the receiving portion 16 on the side of the card insertion opening 18 in order to achieve smooth insertion of the IC card 6.

Figure 12:
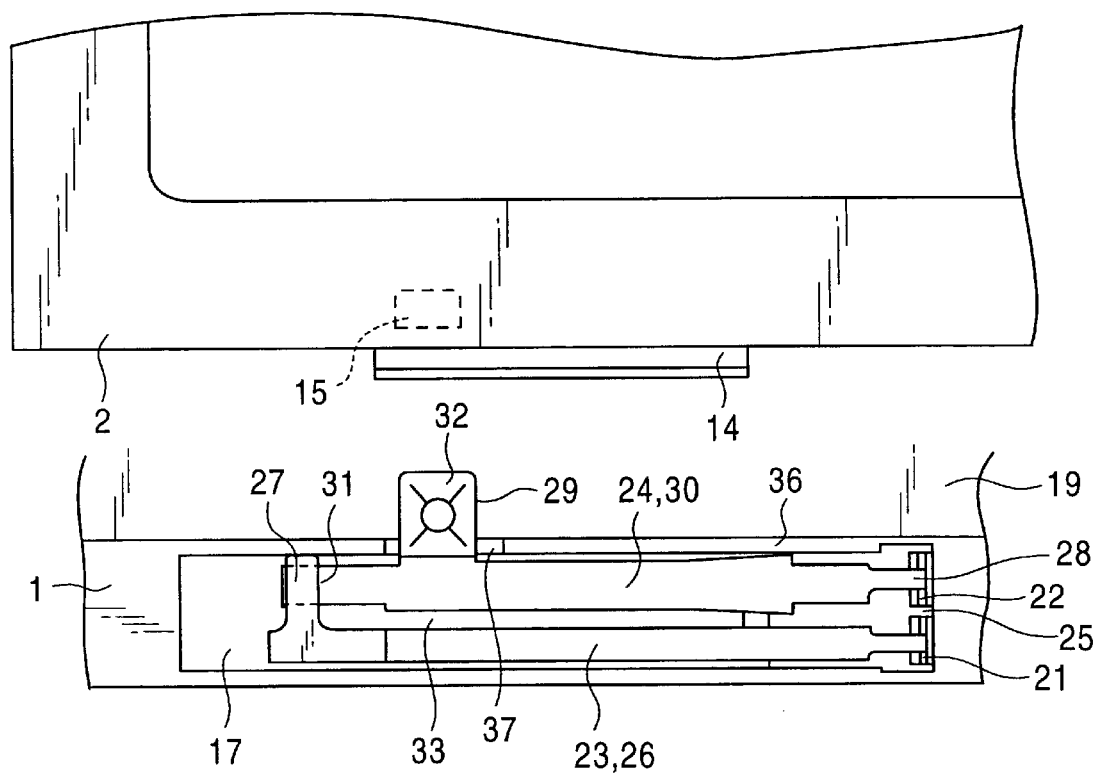
FIG. 12 is a plan view showing a part of the housing having a normally-closed detection switch in the IC card connector, and a part of the cover for covering the housing.
Figure 13:
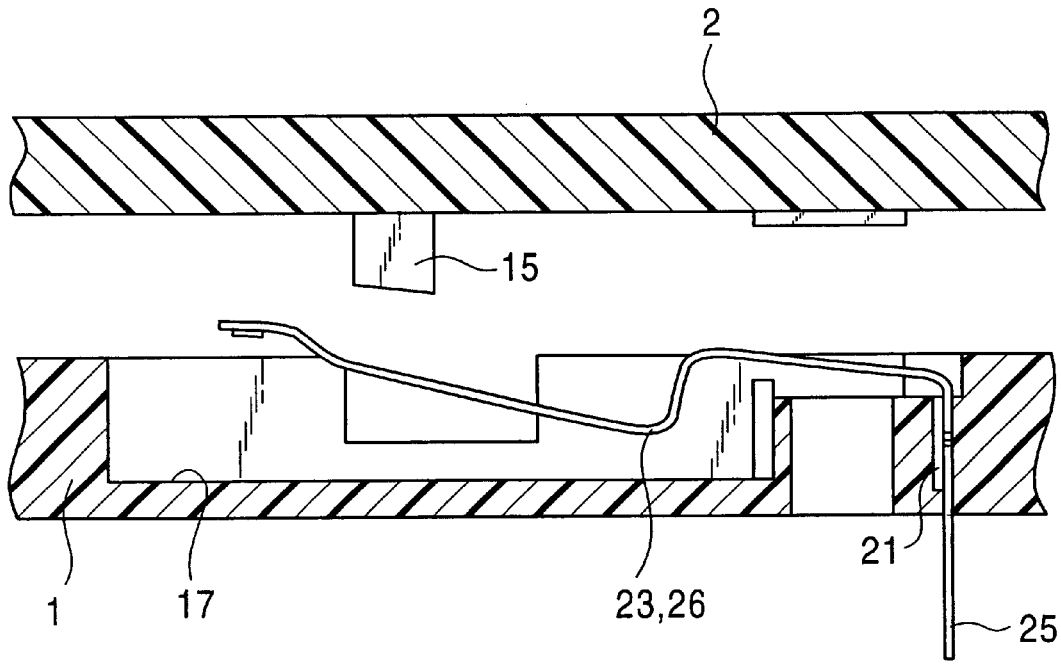
FIG. 13 is a partial sectional view showing the state of a fixed terminal before the cover is mounted.
Figure 14:
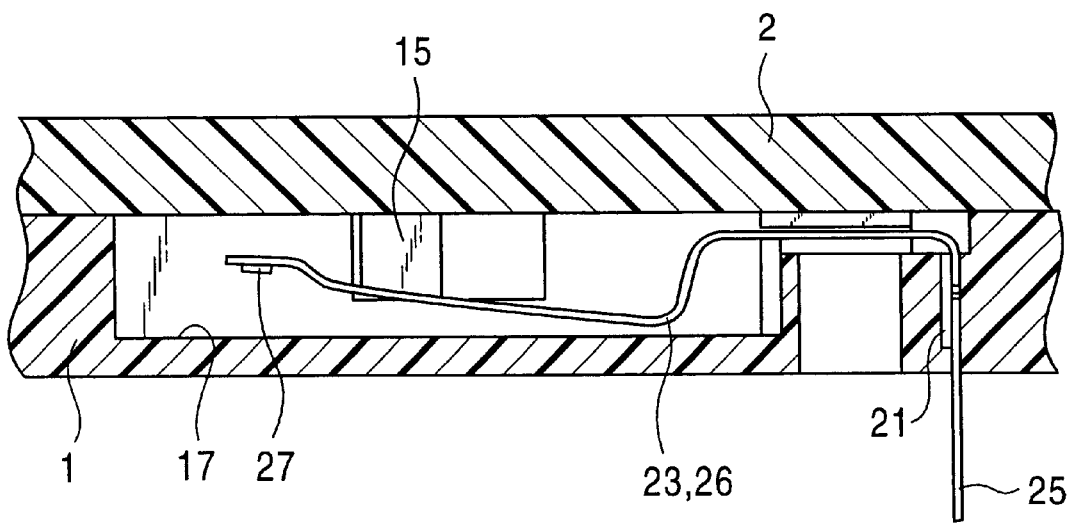
FIG. 14 is a partial sectional view showing the state of the fixed terminal when the cover is mounted.
Figure 15:
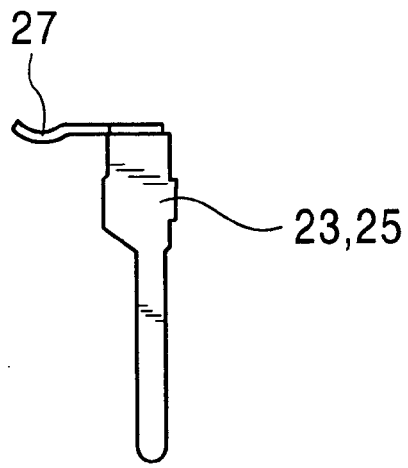
FIG. 15 is a side view of the fixed terminal used in the normally closed detection switch.
Figure 16:
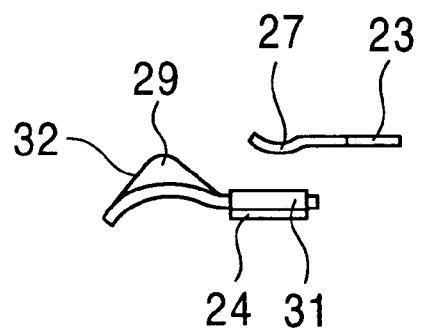
FIG. 16 is a side view showing the positional relationship between the fixed terminal and a movable terminal before the cover is mounted.

Next, a description will be given of the structure of a normally closed detection switch for detecting the insertion and ejection of the IC card 6. FIG. 12 is a plan view showing a part of the housing having a normally closed detection switch, and a part of the cover for covering the housing, FIG. 13 is a partial sectional view showing a state before the cover is mounted, FIG. 14 is a partial sectional view showing a state in which the cover has been mounted, FIG. 15 is a side view of a fixed terminal, and FIG. 16 is a side view showing the positional relationship between the fixed terminal and a movable terminal before the cover is mounted.

The concave detection switch mounting portion 17 is provided at the position of the housing 1 adjacent to the card slot 19, in which a fixed terminal mounting hole 21 and a movable terminal mounting hole 22 are formed side by side. A fixed terminal 23 and a movable terminal 24 are fixed in parallel in the mounting holes 21 and 22, respectively, in a cantilevered manner to constitute a normally closed detection switch.

The fixed terminal 23 includes a fixed portion 25 that is press-fitted in the mounting hole 21 and projects from the lower surface of the housing 1, a middle portion 26 having a stepped bent portion at the midpoint thereof so as to extend from the fixed portion 25 and to be slightly inclined upward from the bent portion toward the leading end, and a contact portion 27 provided at the leading end of the middle portion 26 so as to extend toward the movable terminal 24, as shown in FIG. 12.

The movable terminal 24 includes a fixed portion 28 that is press-fitted in the mounting hole 22 and projects from the lower surface of the housing 1, a middle portion 30 extending from the fixed portion 28 and having at the midpoint thereof an actuator portion 29 extending toward the card slot 19, and a contact portion 31 provided at the leading end of the middle portion 30 so as to be in contact with the contact portion 27 of the fixed terminal 23, as shown in FIG. 12. In this embodiment, the actuator portion 29 is integrally formed of a thin plate forming the movable terminal 24, and has a pressing face 32 that is slightly inclined down toward the card slot 19. An appropriate angle of inclination of the pressing face 32 is within the range of 30° to 60°.

As shown in FIG. 12, first, the fixed portion 28 of the movable terminal 24 is press-fitted in the mounting hole 22, thereby fixing the movable terminal 24. The detection switch mounting portion 17 is provided at the position adjacent to the card slot 19, and is isolated from the card slot 19 by a partition 36 formed therebetween. The partition 36 has a cutout portion 37, from which only the actuator portion 29 of the movable terminal 24 protrudes toward the card slot 19.

Next, the fixed portion 25 of the fixed terminal 23 is press-fitted in the mounting hole 21 at a short distance from the movable terminal 24, and the fixed terminal 23 is fixed in parallel with the movable terminal 24. In this state, the contact portion 27 of the fixed terminal 23 is placed above the contact portion 31 of the movable terminal 24, and is separate from the contact portion 31, as shown in FIG. 16.

Figure 17:
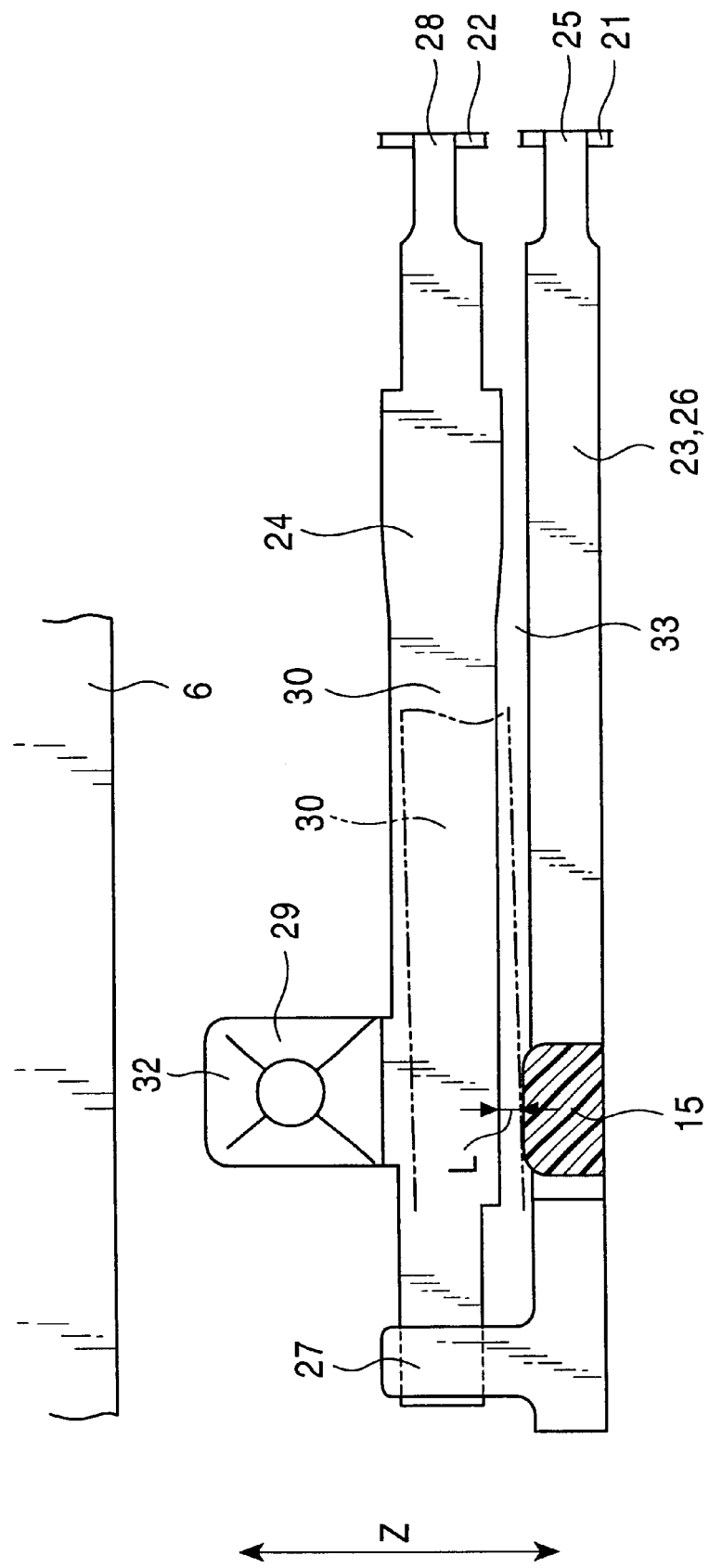
FIG. 17 is a plan view showing the placement of the fixed terminal and the movable terminal.

The projection 15 formed in the cover 2 is positioned opposed to the middle portion 26 of the fixed terminal 23, as shown in FIGS. 13, 14, and 17. When the cover 2 is mounted on the housing 1, the fixed terminal 23 is pressed down by the projection 15, and the contact portion 27 of the fixed terminal 23 is brought into elastic contact with the contact portion 31 of the movable terminal 24, whereby the normally closed switch is placed into a standby state (on-state) (see FIGS. 18 and 20A). The movable terminal 24 is not shown in FIGS. 13 and 14 in order to prevent the figures from being complicated.

Next, the operation of the normally closed detection switch will be described.

As described above, FIGS. 18 and 20A show the state before the IC card 6 is inserted. In this state, when the IC card 6 is inserted into the card slot 19 of the connector (see FIG. 20A), a leading end portion 34 of the IC card 6 impinges on the pressing face 32 of the actuator portion 29 of the movable terminal 24. Since the movable terminal 24 is turnable about the fixed portion 28 in the direction of the arrow Z. as shown in FIG. 17, when the IC card 6 is inserted further with the leading end portion 34 thereof in contact with the pressing face 32 of the actuator portion 29, the movable terminal 24 turns about the fixed portion 28 by a distance L (corresponding to a space 33) toward the projection 15 (in the card inserting direction, i.e., the X-direction), and impinges on the projection 15 (see FIG. 20B).

Figure 18:
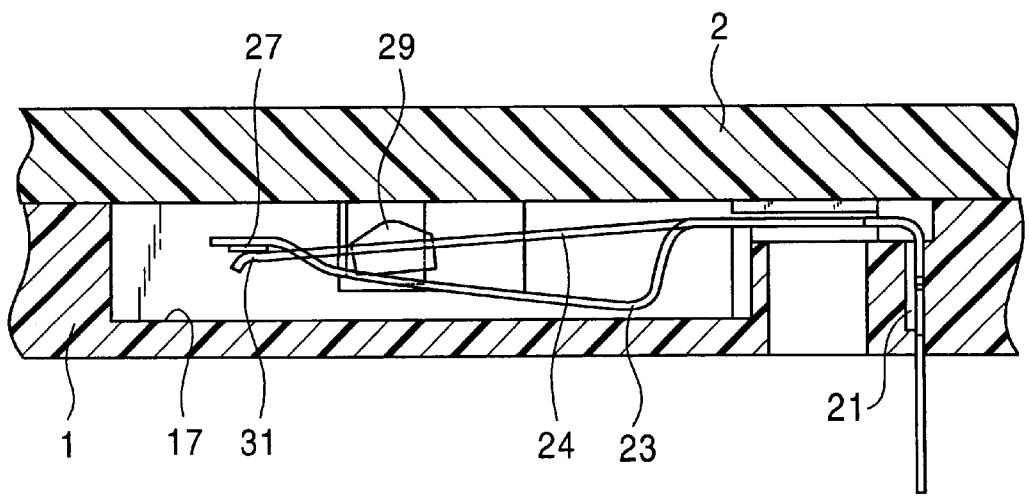
FIG. 18 is a cross-sectional view showing the normally closed detection switch in a standby state.
Figure 19:
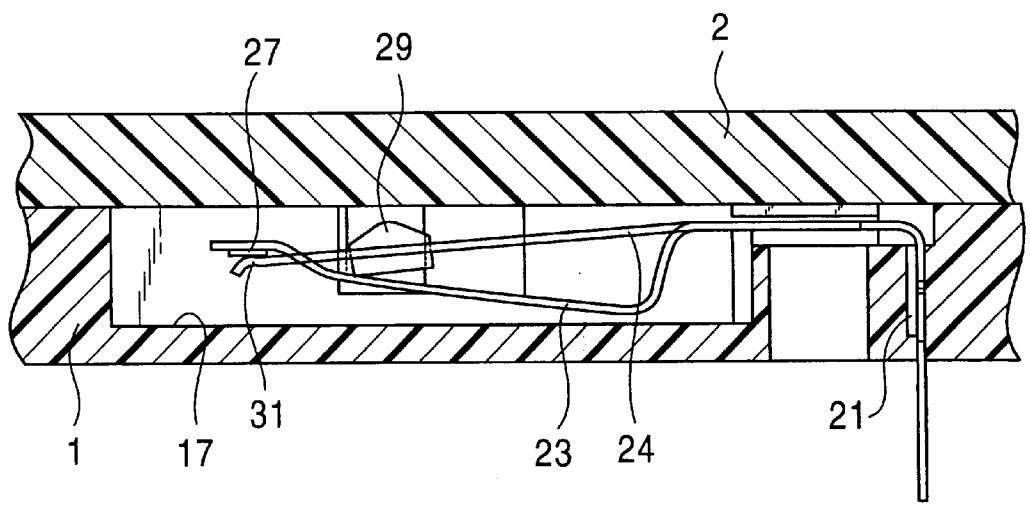
FIG. 19 is a cross-sectional view showing the state of the normally closed detection switch during the insertion of the IC card.
Figure 20A:
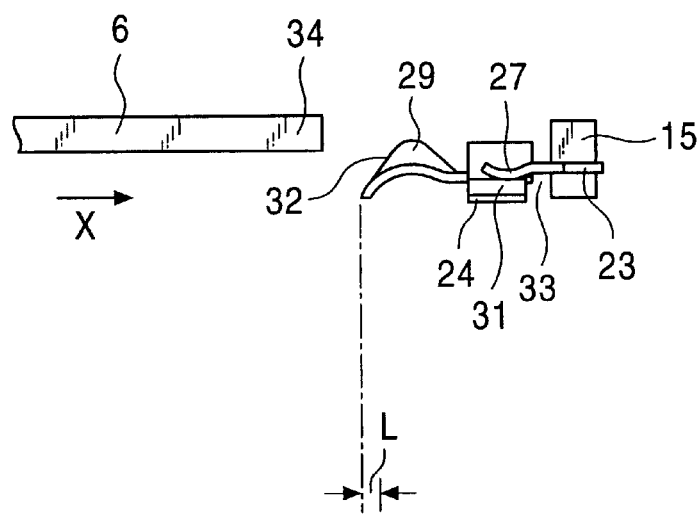
FIGS. 20A and 20B are explanatory views showing how the movable terminal moves from when the normally closed detection switch is in the standby state and until when the IC card is being inserted.
Figure 20B:
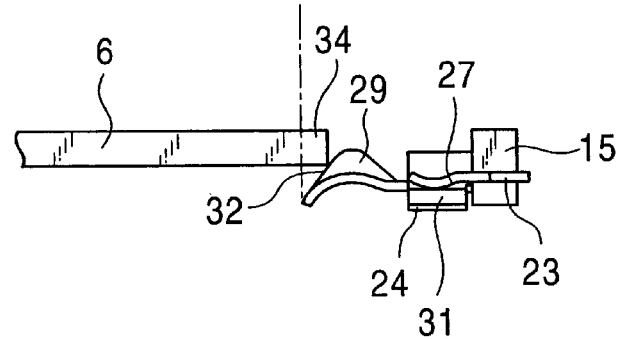

FIGS. 18 and 19 correspond to FIGS. 20A and 20B, respectively. The projection 15 functions as a stopper for the movable terminal 24. The movable terminal 24 (the contact portion 31) slides with respect to the fixed portion 28 (the contact portion 27) until it impinges on the projection 15, which provides a cleaning effect on the contact portions 27 and 31.

Figure 21:
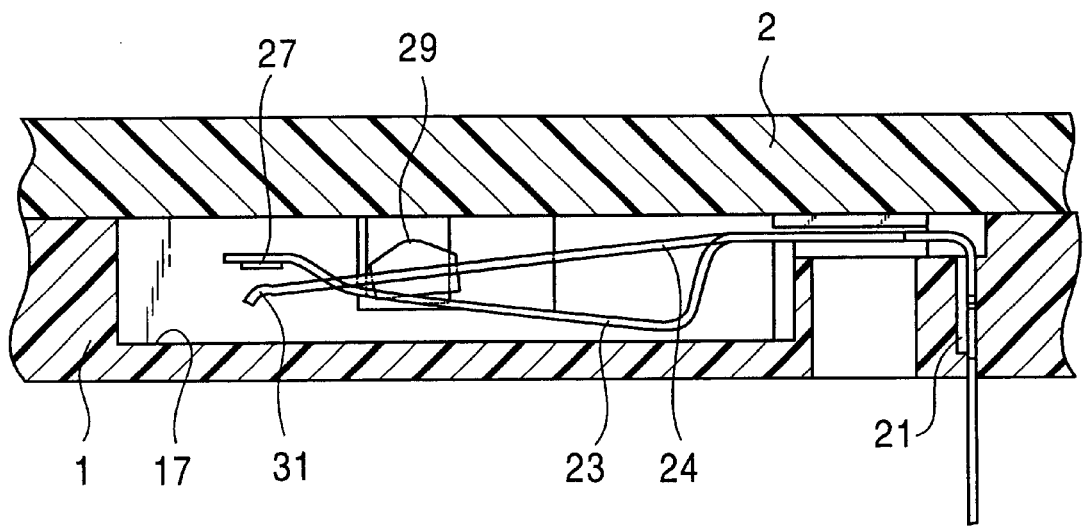
FIG. 21 is a cross-sectional view showing the state of the normally closed detection switch during the insertion of the IC card.
Figure 22:
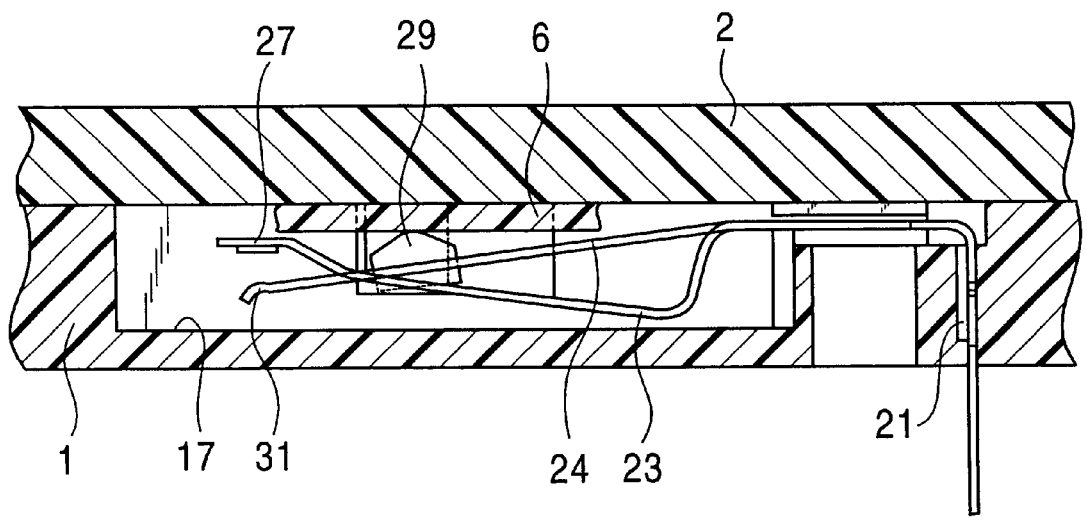
FIG. 22 is a cross-sectional view showing the state of the normally closed detection switch when the insertion of the IC card is completed.
Figure 23A:
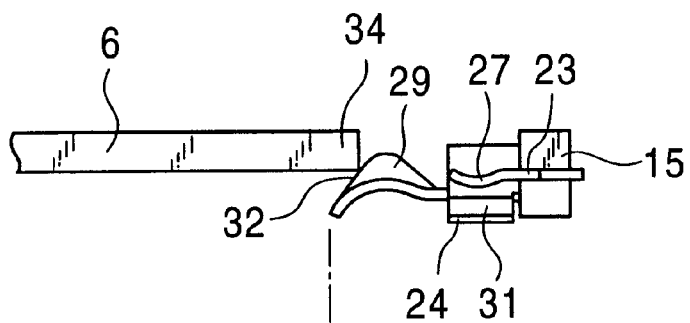
FIGS. 23A and 23B are explanatory views showing how the movable terminal of the normally closed detection switch moves from when the IC card is being inserted until when the insertion of the IC card is completed.
Figure 23B:
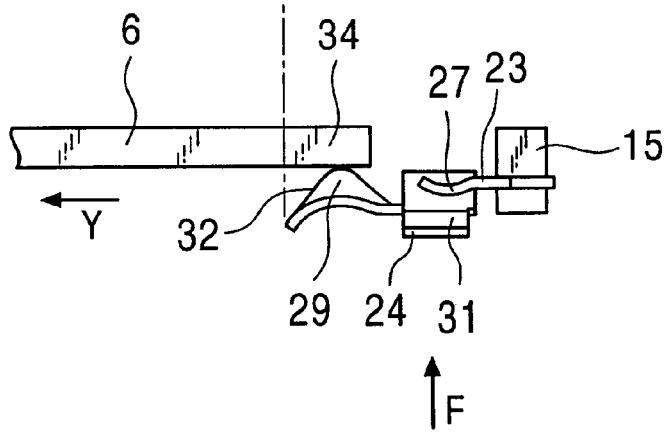

When the IC card 6 is inserted further, the leading end portion 34 thereof runs onto the actuator portion 29, and the movable terminal 24 is pressed down via the actuator portion 29. When the IC card 6 is completely inserted, the leading end portion 34 thereof is placed at the top of the actuator portion 29, and the contact portion 31 of the movable terminal 24 is fully separate from the contact portion 27 of the fixed portion 28, whereby the switch is turned off, and the completion of insertion of the IC card 6 can be electrically detected. In this state, little force acts to press the movable terminal 24 against the projection 15, and therefore, the movable terminal 24 is separated from the projection 15 by restitutive force. FIGS. 21 and 22 correspond to FIGS. 23A and 23B, respectively. In the state in which insertion of the IC card 6 is completed, the movable terminal 24 is pressed down by the IC card 6 via the actuator portion 29, as shown in FIG. 23B. Resilient force resulting from the press acts in the direction of the arrow F, and is orthogonal to the ejecting direction Y of the IC card 6. The resilient force of the movable terminal 24 does not act in the ejecting direction Y of the IC card 6.

After signal exchange between the IC card 6 and the information processing device is completed, when the IC card 6 is drawn out of the card slot 19, the normally closed detection switch is returned to the standby state shown in FIGS. 18 and 20A by the restitutive force of the movable terminal 24.

Since it is satisfactory as long as the distance L between the movable terminal 24 and the projection 15 corresponds to a small sliding distance necessary for the cleaning effect, there is no need to form a large distance such as to have an effect on position accuracy in changeover of the switch from on to off.

Figure 24:
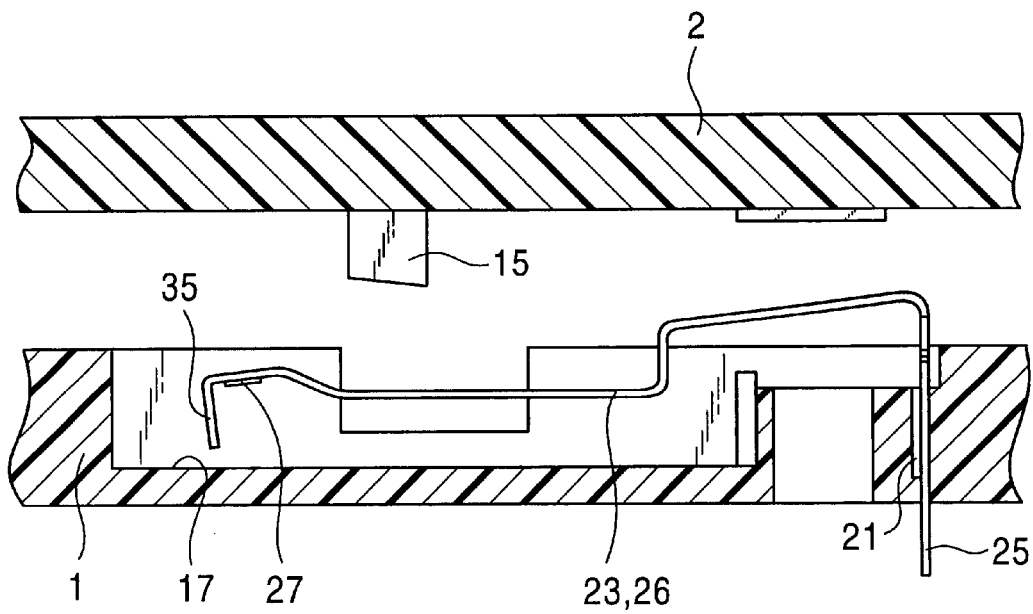
FIG. 24 is a partial sectional view showing the state of a fixed terminal before a cover is mounted in an IC card connector according to a second embodiment of the present invention.
Figure 25:
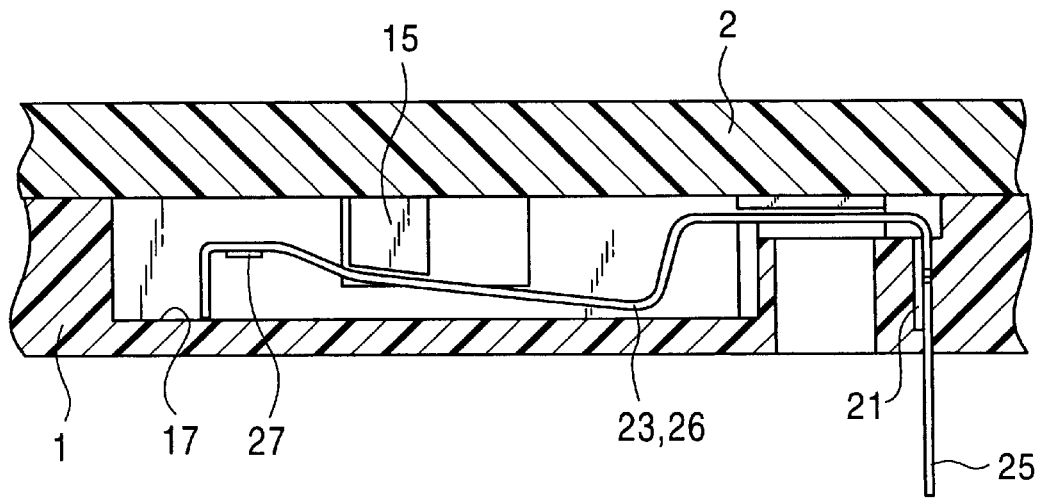
FIG. 25 is a partial sectional view showing the state of the fixed terminal when the cover is mounted.
Figure 26:
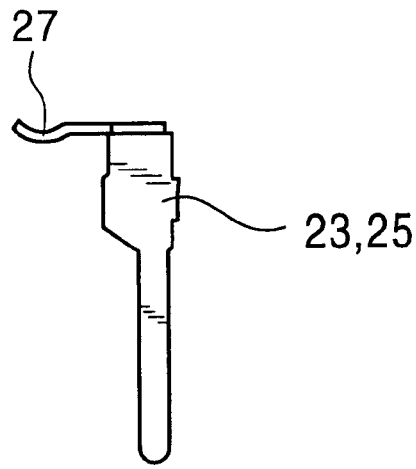
FIG. 26 is a side view of the fixed terminal used in a normally closed detection switch.
Figure 27:
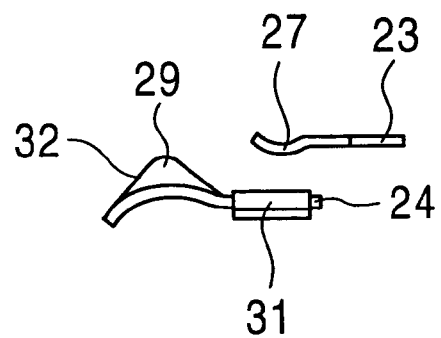
FIG. 27 is a side view showing the positional relationship between the fixed terminal and a movable terminal before the cover is mounted.
Figure 28:
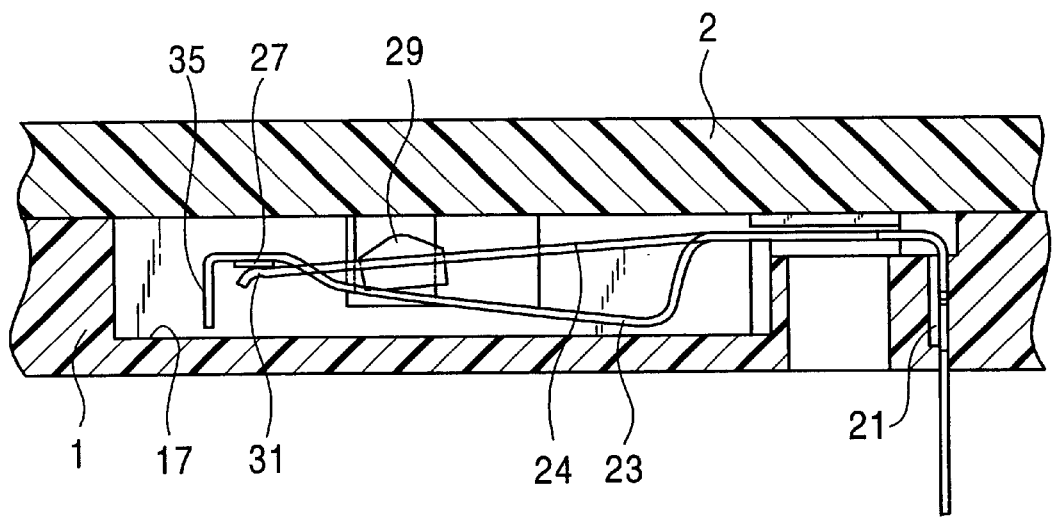
FIG. 28 is a cross-sectional view showing the normally closed detection switch in a standby state.
Figure 29:
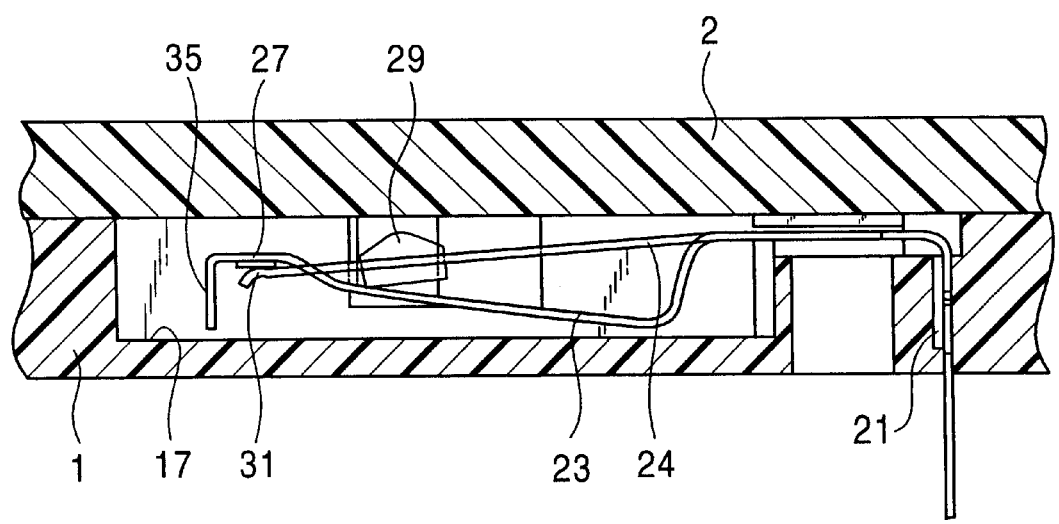
FIG. 29 is a cross-sectional view showing the state of the normally closed detection switch during the insertion of an IC card.
Figure 30A:
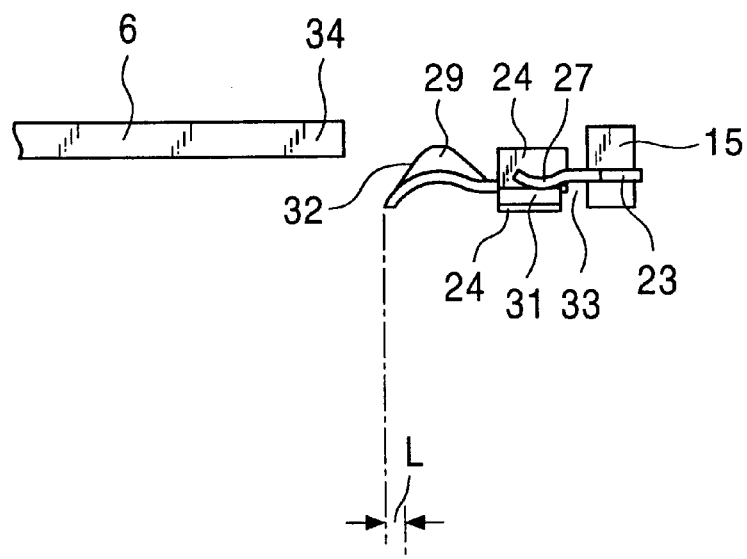
FIGS. 30A and 30B are explanatory views showing how the movable terminal moves from when the normally closed detection switch is in the standby state until when the IC card is being inserted.
Figure 30B:
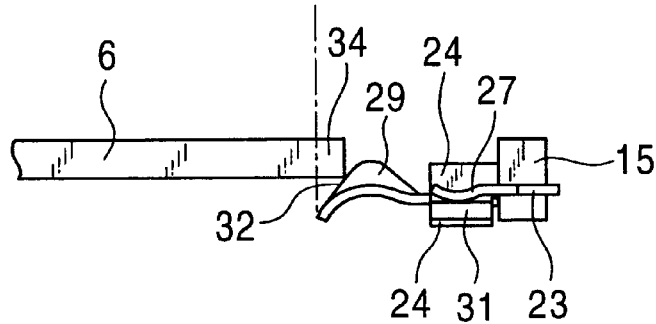
Figure 31:
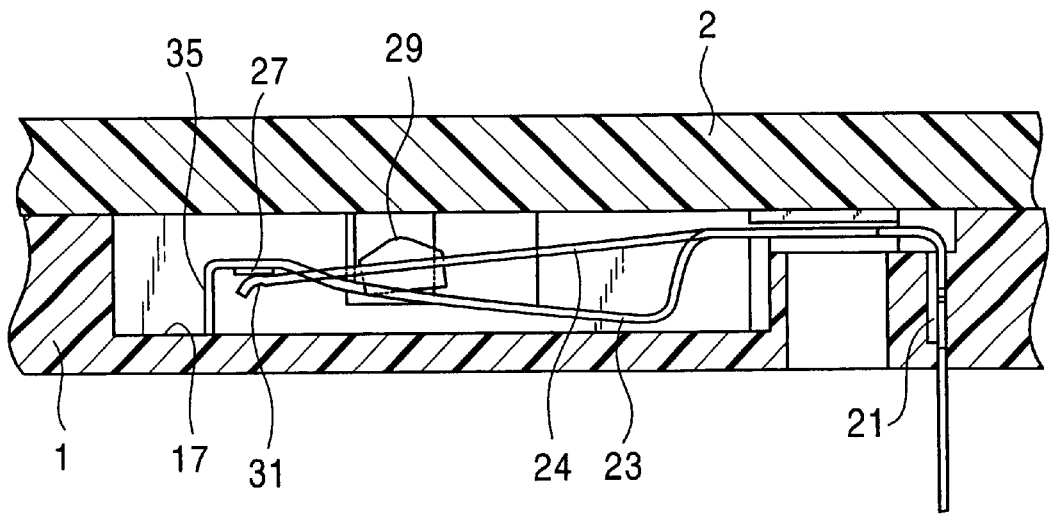
FIG. 31 is a cross-sectional view showing the state of the normally closed detection switch during the insertion of the IC card.

FIGS. 24 to 33 show an IC card connector according to a second embodiment of the present invention. FIG. 24 is a partial sectional view showing the state before a cover is mounted, FIG. 25 is a partial sectional view showing the state in which the cover is mounted, FIG. 26 is a side view of a fixed terminal, and FIG. 27 is a side view showing the positional relationship between the fixed terminal and a movable terminal before the cover is mounted. FIGS. 28 to 33 illustrate the operation of a normally closed detection switch. FIGS. 28, 29, 31, and 32 correspond to FIGS. 30A, 30B, 33A, and 33B, respectively.

This embodiment is different from the first embodiment in that elastic force of a fixed terminal 23 is always directed downward, and is designed to be sufficiently smaller than that of a movable terminal 24.

When only the fixed terminal 23 is incorporated in a housing 1, the leading end of the fixed terminal 23 on the side of a contact portion 27 is in contact with the bottom surface of the housing 1. Since the fixed terminal 23 is actually incorporated in the housing 1 together with the movable terminal 24, however, it is raised by elastic force of the movable terminal 24, whereby the normally closed detection switch is placed into a standby state shown in FIGS. 28 and 30A. The upper side of the fixed terminal 23 raised by the movable terminal 24 is positioned by a projection 15 formed in a cover 2. In this embodiment, a support portion 35 bent downward is provided at the leading end of the fixed terminal 23 on the side of the contact portion 27.

Figure 32:
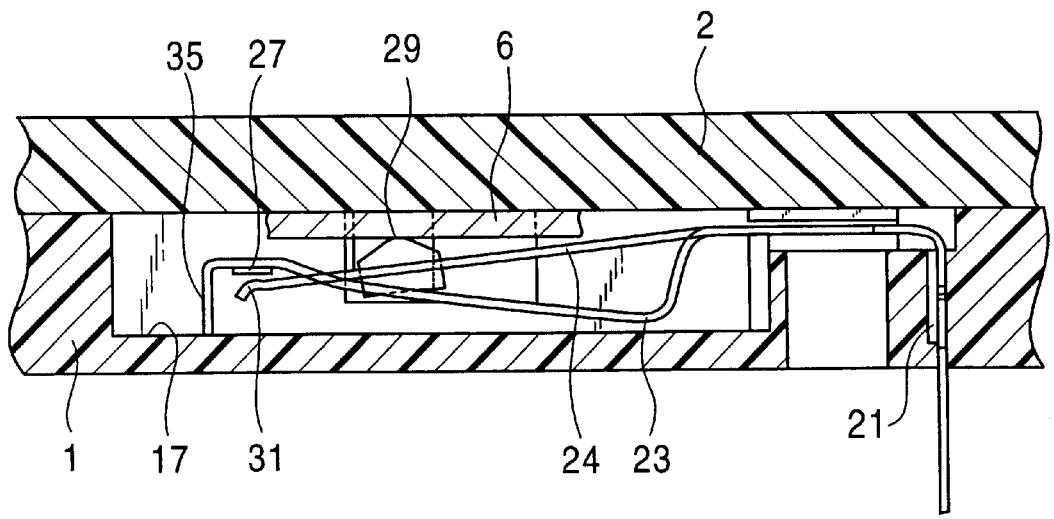
FIG. 32 is a cross-sectional view showing the state of the normally closed detection switch when the insertion of the IC card is completed.
Figure 33A:
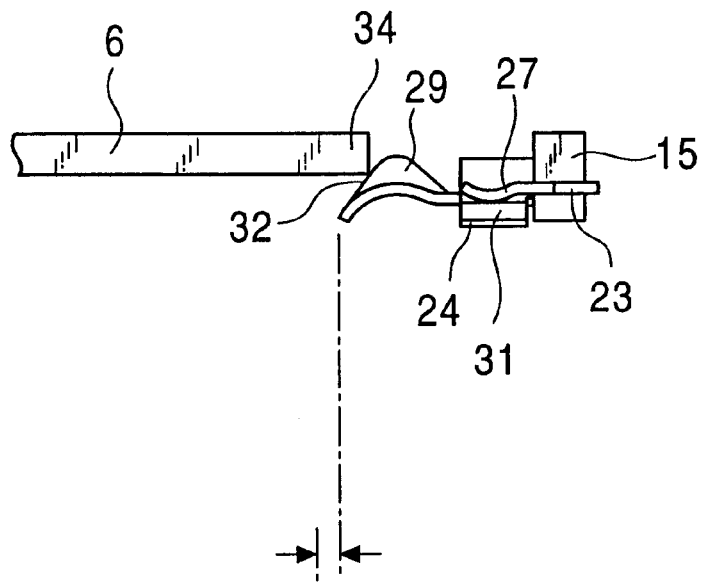
FIGS. 33A and 33B are explanatory views showing how the movable terminal of the normally closed detection switch moves from when the IC card is being inserted until when the insertion of the IC card is completed.
Figure 33B:
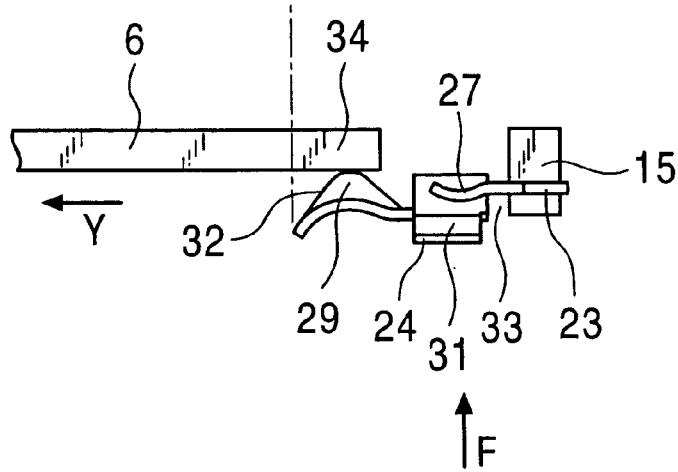
Figure 34:
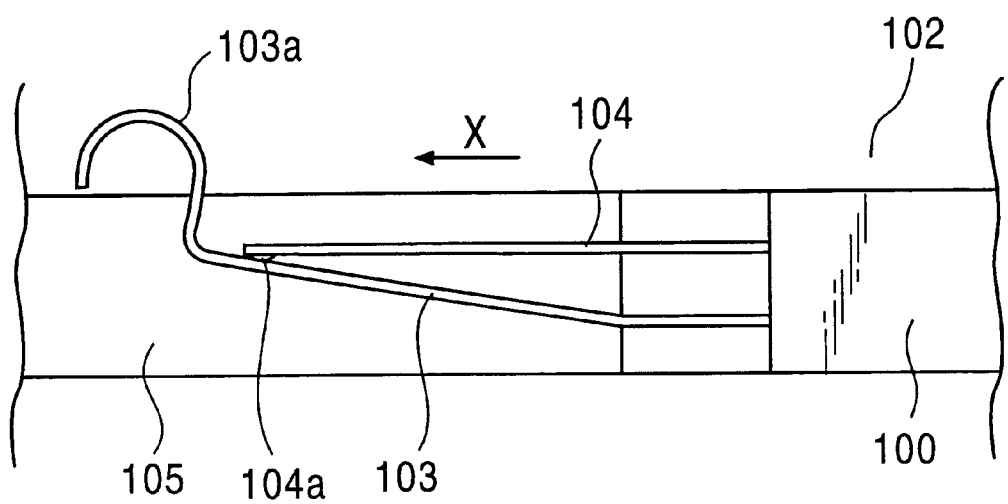
FIG. 34 is a partial side view showing the state of a conventional IC card connector before an IC card is inserted in a card slot.
Figure 35:
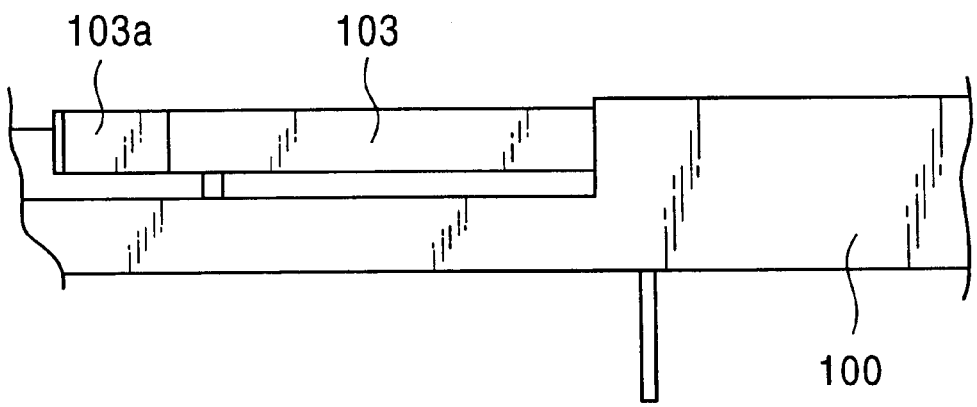
FIG. 35 is a partial plan view showing the state before the IC card is inserted in the card slot.
Figure 36:
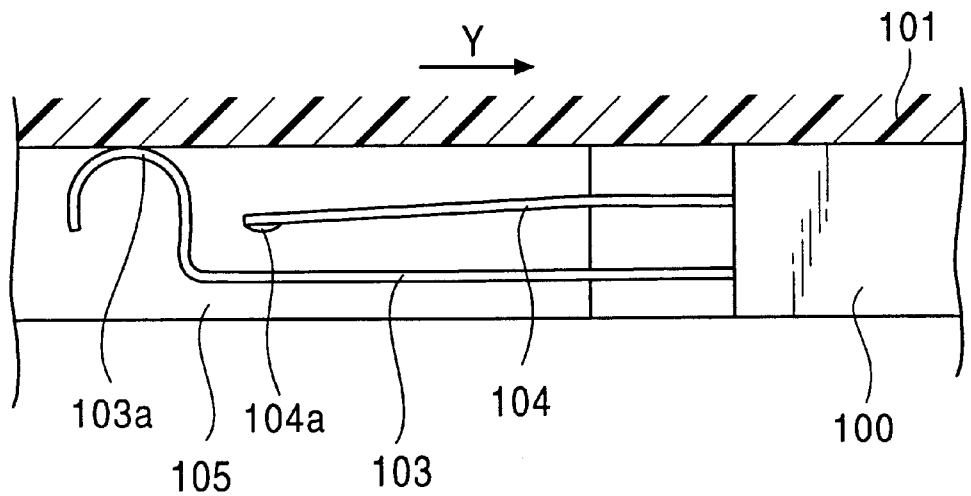
FIG. 36 is a partial side view showing the state of the IC card connector in which the IC card has been inserted in the card slot.
Figure 37:
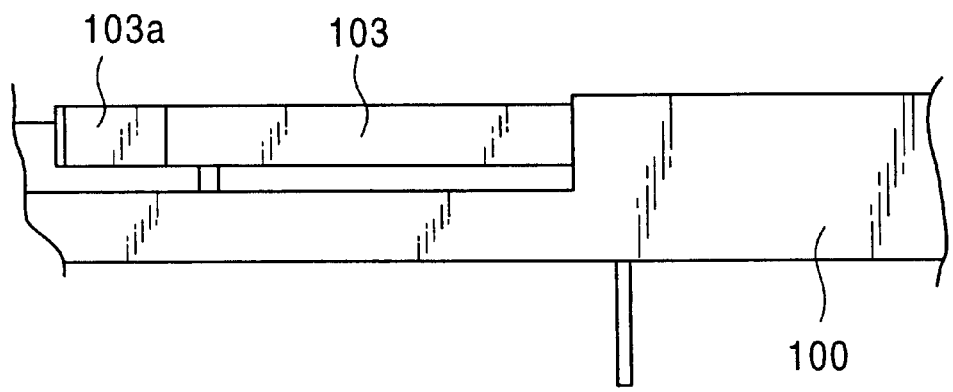
FIG. 37 is a partial plan view showing the state in which the IC card has been inserted in the card slot.

In a manner similar to the first embodiment, the movable terminal 24 horizontally slides with the insertion of an IC card 6 and provides a cleaning effect on the contact portions 27 and 31 (see FIG. 30), and the contact portion 31 of the movable terminal 24 separates from the contact portion 27 of the fixed terminal 23 when the insertion of the card is completed, thereby turning off the switch (see FIGS. 32 and 33B). When the card insertion is completed, the support portion 35 formed adjacent to the contact portion 27 of the fixed terminal 23 impinges on the bottom surface of the housing 1, and is positioned, as shown in FIG. 32, and the fixed terminal 23 is completely separated from the movable terminal 24.

While the fixed terminal 23 is positioned by the support portion 35 thereof in this embodiment, as described above, it may be positioned by providing a support portion (stopper means) in another member such as the housing.

While the IC card is used in the above embodiments, it is to be understood that the present invention is not limited to the above embodiments, and is also applicable to cases in which other cards, for example, a magnetic card and an optical card, are used.

What is claimed is:

1. A card connector comprising:

a housing having an opening on an upper side to receive a card from a side face;

a cover covering said opening on said upper side of said housing;

card detecting means disposed in said housing and having a fixed terminal and a movable terminal for detecting an insertion of said card into said housing by moving said movable terminal in response to said insertion of said card to actuate a switch comprising said fixed terminal and said movable terminal;

wherein said fixed terminal is elastic and is supported in an inner part of said housing as a cantilever extending along a surface of said card that is orthogonal to an inserting direction of said card, said fixed terminal having a leading end portion;

wherein said cover has a projection configured to press a free end of said fixed terminal in a downward direction such that said fixed terminal is stationary and forms a normally closed switch with said movable terminal;

wherein said movable terminal is supported in said inner part of said housing as a second cantilever extending along a surface of said card that is orthogonal to said inserting direction of said card and is positioned to a side of said fixed terminal, said movable terminal having a protuberant actuator portion having a pressing face inclined to said card inserting direction and said movable terminal being elastically deformable in vertical directions and having a contact portion at a leading end, said contact portion being movable in said vertical directions into a contact with and away from said leading end portion of said fixed terminal;

wherein said movable terminal is configured to move in said card inserting direction while being elastically deformed when said pressing face is in contact with a leading end portion of said card causing said contact portion of said movable terminal to make contact with said projection of said cover, said projection of said cover being configured to limit movement in said card inserting direction of said movable terminal; and wherein said protuberant actuator portion has a top portion configured to press said contact portion away from said leading end portion when said leading end of said card contacts said top portion of said protuberant actuator.

2. A card connector according to claim 1, wherein an upward acting resilient force biases said movable terminal when said top portion of said protuberant actuator portion contacts said leading end of said card.

3. A card connector according to claim 1, wherein said projection is configured to limit a distance in which said movable terminal slides in contact with said fixed terminal which Provides a cleaning effect between said contact portion of said movable terminal and said leading end portion of said fixed terminal.

4. A card connector according to claim 1, wherein said movable terminal is a unitary part of said protuberant actuator portion.

5. A card connector according to claim 1, wherein a card slot is formed in said housing to receive a card and a mounting portion for said fixed terminal and said movable terminal is adjacent to said card slot, a partition is formed between said mounting portion and said card slot, and said protuberant actuator portion of said movable terminal protrudes toward said card slot through a cutout portion formed in said partition.

6. A card connector according to claim 1 wherein said movable terminal comprises a fixed portion supported by said housing, said fixed portion being configured to have a narrower width than said contact portion.

* * * * *